US011390570B1

(12) United States Patent
Merritt

(10) Patent No.: US 11,390,570 B1
(45) Date of Patent: Jul. 19, 2022

(54) HUMIC ACID-SUPPLEMENTED FERTILIZERS, MACRONUTRIENTS, AND MICRONUTRIENTS

(71) Applicant: Humic Growth Solutions, Inc., Jacksonville, FL (US)

(72) Inventor: Kevin Merritt, St. Augustine, FL (US)

(73) Assignee: Humic Growth Solutions, Inc., Jacksonville, FL (US)

( * ) Notice: Subject to any disclaimer, the term of this patent is extended or adjusted under 35 U.S.C. 154(b) by 130 days.

(21) Appl. No.: 16/585,456

(22) Filed: Sep. 27, 2019

Related U.S. Application Data

(60) Division of application No. 15/497,396, filed on Apr. 26, 2017, now abandoned, which is a continuation-in-part of application No. 14/738,865, filed on Jun. 13, 2015, now Pat. No. 9,914,670.

(60) Provisional application No. 62/328,406, filed on Apr. 27, 2016, provisional application No. 62/013,789, filed on Jun. 18, 2014.

(51) Int. Cl.

| | | |
|---|---|---|
| *C05F 11/02* | (2006.01) | |
| *C05B 7/00* | (2006.01) | |
| *C08H 7/00* | (2011.01) | |
| *C05D 3/02* | (2006.01) | |
| *C05B 17/00* | (2006.01) | |
| *C05C 9/00* | (2006.01) | |
| *C05D 5/00* | (2006.01) | |
| *C05C 5/02* | (2006.01) | |
| *C05C 9/02* | (2006.01) | |
| *C05D 3/00* | (2006.01) | |
| *C05D 9/02* | (2006.01) | |
| *C05C 5/04* | (2006.01) | |
| *C05B 1/06* | (2006.01) | |
| *C05C 3/00* | (2006.01) | |
| *C05D 1/00* | (2006.01) | |
| *C05D 1/02* | (2006.01) | |
| *C05C 1/00* | (2006.01) | |
| *C05G 5/12* | (2020.01) | |
| *C05G 5/30* | (2020.01) | |

(52) U.S. Cl.
CPC ............ *C05F 11/02* (2013.01); *C05B 1/06* (2013.01); *C05B 7/00* (2013.01); *C05B 17/00* (2013.01); *C05C 1/00* (2013.01); *C05C 3/00* (2013.01); *C05C 5/02* (2013.01); *C05C 5/04* (2013.01); *C05C 9/00* (2013.01); *C05C 9/02* (2013.01); *C05D 1/00* (2013.01); *C05D 1/02* (2013.01); *C05D 3/00* (2013.01); *C05D 3/02* (2013.01); *C05D 5/00* (2013.01); *C05D 9/02* (2013.01); *C05G 5/12* (2020.02); *C05G 5/30* (2020.02); *C08H 6/00* (2013.01)

(58) Field of Classification Search
CPC .. C05F 11/02; C05G 5/12; C05G 5/30; C05D 3/02; C05D 5/00; C05D 9/02; C05D 1/00; C05D 1/02; C05D 3/00; C05C 5/02; C05C 1/00; C05C 9/02; C05C 5/04; C05C 9/00; C05C 3/00; C05B 7/00; C05B 1/06; C05B 17/00; C08H 6/00
See application file for complete search history.

(56) References Cited

U.S. PATENT DOCUMENTS 3,617,237 A * 11/1971 Nagasawa ................ C10F 7/00
71/24

FOREIGN PATENT DOCUMENTS

| CN | 101921151 A | 12/2010 |
| CN | 102898254 A | 1/2013 |
| CN | 103274798 A * | 9/2013 |

OTHER PUBLICATIONS

Humic Growth Solutions. "Diamond-Grow Organic 100% Soluble" <http://pritchardag.com/wp-content/uploads/2015/06/100SolubleHumicAcidPowder-Complete_English.pdf> Jun. 2015 (Year: 2016).*
Chemical Engineering. "Powder and Bulk Solids Handling: Particle Size and Distribution Analysis" <https://www.chemengonline.com/powder-bulk-solids-handling-particle-size-distribution-analysis/> Nov. 1, 2017 (Year: 2017).*
IPNI (2013) 4R Plant Nutrition Manual: A Manual for Improving the Management of Plant Nutrition. Bruulsema, T W; Fixen, P E and Sulewski, G D (eds). International Plant Nutrition Institute, Norcross, GA, USA (Year: 2013).*
Rice et al. "Characterization of a Stream Sediment Humin" in Aquatic Humic Substances; Suffet, I., et al.; Advances in Chemistry; American Chemical Society: Washington, DC, 1988.
Rice et al. "Isolation of HumIn by LIquId-LiquId PartItIonIng," The Science of the Total Environment, 81/82 (1989) 61-69.
Rice et al. "A Model of Humin," Environ. Sci. Technol. vol. 24, Issue 12, 1990, 1875-77.
Rice et al. "Statistical evaluation of the elemental composition of humic substances," Org. Geochem. vol. 27, Issue 5, 1991, 635-648.
Rice, et al. "Comments on the Literature of the Humin Fraction of Humus," Geoderma 43,1988, 65-73.
TeraVita 100% Soluble Humic Acid Powder. Root Naturally. <http://www.rootnaturally.com/store/humic-acid/36-1-lb-humic-acid-soluble-powder.html> May 14, 2013.

(Continued)

*Primary Examiner* — Jennifer A Smith
(74) *Attorney, Agent, or Firm* — Hovey Williams LLP

(57) ABSTRACT

Highly water-soluble humic acid products such as powders and compacted solids or granules are provided, which can be used directly as crop growth enhancers, or can be coated on or mixed with solid fertilizers. Preferred fertilizer products include humic acid-supplemented MAP, DAP, and urea, particularly where the humic acid fraction is distributed throughout the structure of the solid fertilizers.

13 Claims, No Drawings

(56) References Cited

OTHER PUBLICATIONS

TeraVita. Current Products <http://www.teravita.com/Products/Products.htm> Apr. 15, 2012.
Diamond Grow organic 100% soluble humic acid 95% powder. Humic Growth Solutions. < http://www.humicgrowth.com:80/organiccertificates.htm> Mar. 15, 2013.
EF Soluble Humate Granules. Environmental Fertilisers. <http://environmentalfertilisers.co.nz/ef-soluble-humate-granules/> Feb. 7, 2013.
Levinsky, B. "Humates and humic acids." How do they work (2002): 1-11.

* cited by examiner

HUMIC ACID-SUPPLEMENTED FERTILIZERS, MACRONUTRIENTS, AND MICRONUTRIENTS

CROSS-REFERENCE TO RELATED APPLICATIONS

This application is a division of application Ser. No. 15/497,396 filed Apr. 26, 2017, which claims the benefit of provisional application Ser. No. 62/328,406 filed Apr. 27, 2016, and which is a continuation-in-part of application Ser. No. 14/738,865, filed Jun. 13, 2015 (now U.S. Pat. No. 9,914,670 issued Mar. 13, 2018), which claims the benefit of provisional application Ser. 62/013,789 filed Jun. 18, 2014; each of the foregoing application is incorporated herein by reference in its entirety.

BACKGROUND OF THE INVENTION

Field of the Invention

A process such as is described in various embodiments herein relates to a process for making a water-soluble solid or granule enriched in humic acid. Such a granule is useful as an organic aid to crop growth, particularly in applications where solubility is desirable or necessary. Additionally, the invention pertains to high water solubility humic acid solids and fertilizer products containing such solids, as well as methods of coating solid fertilizers with humic acids, and/or co-agglomerating solid fertilizer ingredients and humic acid fractions to yield products. These products minimize volatilization, leaching, and run-off of nutrients owing to the binding capacity of the humic acid fractions.

Description of the Prior Art

Extraction of humic acid and related materials from carbonaceous raw materials such as Humalite has been practiced for years and is accordingly known in the art. Process steps vary, but the process output is generally a particulate material with suboptimal solubility in water.

Suboptimal solubility in water of particulate material enriched in humic acid and related materials presents a problem. Because organic and other producers typically prefer to apply mixtures that contain solvents such as water that are safe and healthful for both plants and workers, there is a need, long-felt by now, for a process for making a water-soluble granule enriched in humic acid.

Fertilization of soil to supply necessary nutrients to soil is a requisite for modern and sustainable agriculture. Proper fertilization program estimates the need of the nutrient after proper soil analysis and after determining the missing nutrients essential for a particular crop. Most plants require nitrogen for plant growth and development. These requirements are fulfilled by adding commercially available cheap fertilizers like urea, monoammonium phosphate (MAP), diammonium phosphate (DAP), among others. However these fertilizers are highly susceptible to losses in the form of volatilization, leaching and/or run-off, among others. Due to this, fertilizers have to be applied to soils in quantities significantly more than what is needed in order to overcome the losses. The loss of fertilizer amounts not only to economic loss as more input is required, but also to indirect ones, such as lost labor, and increased transportation and application costs. The largest impact of the over-application of chemical fertilizers is on the environment because the fertilizer from run-off or from volatilization accumulates elsewhere, promoting the growth of unwanted organisms such as algae, weeds etc. Thus there may also be clean-up costs involved.

Humic acids are well-known soil amendments that can produce good binding capabilities, owing to their virtuous properties such as high cation exchange capacity and high carbon content, which is bound in the form of organic complexes like aldehydes, ketones, amides, peptides, among others and high levels of organic matter. Thus, humic acids can increase cation exchange capacity of the soils, increase nutrient uptake, increase fertilizer efficiency and microbial activity. Humic acids are therefore commonly employed for use with regular solid fertilizers, typically as simple fertilizer-humic acid mixtures. It has also been known to coat fertilizers such as urea with humic acids, using a binder for this purpose.

SUMMARY OF THE INVENTION

Accordingly, in one aspect of the invention, processes are provided which unexpectedly enhance the water-solubility of humic acid-enriched solids or granules (as used herein, "solid" with reference to the humic acid products of the invention refers to powders, typical granules, and solids of other types). Such processes broadly comprise:
 obtaining a sample of a carbonaceous substance comprising humic acid and one or more other substances;
 contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;
 maintaining the sludge component in contact with the extraction component for a period of time sufficient for the extraction component to become relatively enriched in humic acid and the sludge component to become relatively depleted of humic acid;
 separating the sludge component from the extraction component;
 drying the extraction component, thereby forming a plurality of powder particles; compacting at least a portion of the plurality of powder particles under conditions wherein the at least a portion of the plurality of powder particles, as a result of the compacting, are made into a form of a granule;
thereby making a water-soluble solid or granule enriched in humic acid.

In a second method aspect, water-soluble solids or granules may be made by processes comprising:
 obtaining a sample of a carbonaceous substance comprising humic acid and one or more other substances;
 contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;
 maintaining the sludge component in contact with the extraction component for a period of time sufficient for the extraction component to become relatively enriched in humic acid and the sludge component to become relatively depleted of humic acid;
 separating the sludge component from the extraction component;

drying the extraction component, thereby forming a plurality of powder particles; and compacting at least a portion of the plurality of powder particles under conditions wherein the at least a portion of the plurality of powder particles, as a result of the compacting, are made into a form of a granule.

Corresponding compacted products made by the above-described processes are also within the ambit of the invention. More generally, such solid or granular humic acid products comprise dried, self-sustaining solids having a moisture content of from about 9-15% by weight (more preferably from about 10-14%, and most preferably from about 11-13% by weight). Additionally, such solids should have a loose bulk density of from about 28-49 lbs per cubic foot (more preferably from about 31.5-45.5, and most preferably from about 35-42 lbs per cubic foot). The particles within the solid products advantageously have a size distribution wherein about 1.5% by weight of the particles are less than about 100 microns, about 15% by weight of the particles are less than 200 microns, about 35% by weight of the particles are less than about 270 microns, and about 55% of the particles are less than about 400 microns. The size of the compacted solids or granules should be from about 0.5-4.5 mm (more preferably from about 0.8-4 mm, and most preferably from about 0.8-2 mm). In terms of solubility, it is preferred that at least about 75% of a representative granule is dissolved within 5 minutes after being submerged 1 liter of water at a temperature of 25 degrees Celsius (more preferably at least about 90%, still more preferably at least about 95%, still more preferably at least about 99%, and most preferably at least about 100% of the granule is dissolved within 5 minutes after being submerged in 1 liter of water at a temperature of 25 degrees Celsius). The 100% soluble wet chemistry activated humic acids described herein are characterized by the fact that essentially 100% of the humic acid content thereof (i.e., at least about 98%), either in powder or compacted solid form, will dissolve in excess 25 degrees Celsius water within 5 minutes; excess water in this context means at least about 1000 g of water per gram of humic acid.

Even more advantageously, at least about 75% of the representative granule is dissolved within 1 minutes when the granule is submerged in 1 liter of water at a temperature of 25 degrees Celsius (more preferably at least about 90%, still more preferably at least about 95%, still more preferably at least about 99%, and most preferably at least about 100% of the granule is dissolved within 1 minute after being submerged in 1 liter of water at a temperature of 25 degrees Celsius).

The particulate humic acids prepared in accordance with the invention are essentially pure humic acids, i.e., the powders contain no more than about 5% by weight, more preferably no more than about 2% by weight of contaminants such as sand or ash. Therefore, the compacted products have the same level of humic acids therein, save for those situations where small amounts of binders are used to form the solids or granules.

Fertilizer products in accordance with the invention may be made in two general ways, but in all instances the products are characterized by an intimate contact between the solid fertilizers and the high-solubility humic acid products of the invention. In one preparation method, solid fertilizers are coated with the humic acid particles. This is typically accomplished by blending the fertilizer and humic acid powder for an appropriate period of time, with or without the use of binders. In another method, a quantity of the humic acid powder is substantially uniformly dispersed throughout the structure of solid fertilizers. For example, during the production of solid fertilizers such as MAP or DAP using rotary granulator equipment, appropriate amounts of the humic acid powder may be added along with the normal MAP or DAP precursor ingredients, so that the humic acid particles are evenly dispersed throughout the resultant granular product. More generally, useful agglomeration methods are preferably selected from the group consisting of chemical granulation, physical granulation, fluid bed granulation, and prilling.

The final fertilizer compositions typically include humic acids at a level of from about 0.01-12% by weight, more preferably from about 0.02-8% by weight, and most preferably from about 1-5% by weight, based upon the total weight of the products taken as 100% by weight.

DETAILED DESCRIPTION

A process such as is described in various embodiments herein now will be described more fully hereinafter. A process such as is described in various embodiments herein may, however, be embodied in many different forms and should not be construed as limited to the embodiments set forth herein; rather, these embodiments are provided so that this disclosure will be thorough and complete, and will fully convey the scope of a process such as is described in various embodiments herein to those skilled in the art. As used in this specification and the claims, the singular forms "a," "an," and "the" include plural referents unless the context clearly dictates otherwise. When used in this specification and the claims as an adverb rather than a preposition, "about" means "approximately" and comprises the stated value and every value within 10% of that value; in other words, "about 100%" includes 90% and 110% and every value in between.

When used in this specification and the claims, a "water-soluble granule" refers to a granule that dissolves readily in water under typical conditions of use.

When used in this specification and the claims, a product is "enriched in humic acid" if the product possesses a higher concentration of humic acid than a raw material from which the product is made. A component becomes "enriched in humic acid" as the concentration of humic acid in the component increases. A component becomes "depleted of humic acid" as the concentration of humic acid in the component decreases.

When used in this specification and the claims, a "carbonaceous substance comprising humic acid and one or more other substances" refers to a carbonaceous substance that contains humic acid and that also contains one or more other substances other than humic acid. An example is Humalite. An example is lignite. An example is Leonardite.

Aspects of a process such as is described in various embodiments herein are further illustrated by the following examples, which are set forth to illustrate certain aspects of a process such as is described in various embodiments herein and are not to be construed as limiting thereof.

In an example, production of a granule enriched in humic acid was undertaken as a multi-step process comprising blending of raw material and an alkaline mixture in a blend tank; screening of the blended mixture that was made in the blend tank; drying of the liquid derived from screening of the blended mixture, thereby forming a fine powder; and conversion of the fine powder to form granules.

In an example, a blending of raw material with an alkaline mixture in a blend tank resulted in extraction of humic acid and other humic substances from the raw material. Hot water and caustic potash solution and Humalite were added to a thermally insulated tank in that order and blended. The hot water was at 160-180 degrees Fahrenheit. The caustic potash solution was 45% membrane grade. The mass ratio of hot water to caustic potash solution to Humalite was 73.7:5.8:20.5.

In an example, water, caustic potash solution and Humalite were placed into a thermally insulated tank to form a 42,000 lb mixture, which was then blended. The liquid phase was sampled, and a colorimetric assay for humic acid was performed on each sample, in which the amount of light absorbed was proportional to the concentration of humic acid.

In an example, a blended mixture prepared according to the paragraph immediately above consisted of liquid and sludge. This blended mixture was then pumped by a 3 HP motor to two 200 mesh screeners at a rate of ~40 gal/min (~350 lbs/min). It took ~120 minutes to screen 42000 lbs. The screener allowed liquids and very small particles to be passed through, but not the sludge. The amount of sludge varied, but typically the sludge was 5-7% of the total weight of the blended mixture.

In an example, the sludge still possessed some humic content and was given away to local farmers free of charge. The screened liquid, which had a density of 8.35-9 lb/gallon, was collected in an insulation tank, which had a capacity of 12500 gal. The liquid was pumped from the insulation tank to a spray dryer firing tank from which it was transferred to a spray dryer.

In an example, a spray dryer system comprised a burner, a dryer, two cyclone separators, a baghouse and a powder hopper. Liquid was processed at a rate of 14-16 gal/min. Hydraulic pressure-nozzle atomization was used in which liquid was passed through a filter and then through a hydraulic pressure pump. The pressure of the liquid was directly proportional to the force delivered by the hydraulic pressure pump and was generally 1500 psi but ranged from 1300-1700 psi depending on the moisture of the fine powder. The liquid was then forced through 8 nozzles to break the liquid into fine droplets. Filtered air was passed through a burner where it was heated to 600-650 degrees Fahrenheit. The temperature of the inlet air never exceeded 800 degrees Fahrenheit. The hot air met the liquid droplets in a co-current manner for a time of about 2 seconds. This time was enough to remove more than 85% of the moisture from the dryer to form a powder, which was collected in a common line. The air emerging out of the dryer still had some particles and was generally at 190-205 degrees Fahrenheit and never exceeded 250 degrees Fahrenheit. Heavier particles were collected using two cyclone separators in series and the lighter particles were collected using a baghouse filter. The hot gas, also called flue gas, was then emitted from the bag house; the hot gas consisted mostly of air and steam at 150-180 degrees Fahrenheit. The temperature of the exhaust never exceeded 250 degrees Fahrenheit. The powder from the common line was then transferred to a powder hopper. Moisture content of the powder was measured and kept between 11%-13%. When the moisture was below 11%, moisture content was increased in either of two ways, by reducing the temperature of the burner or by operating the hydraulic pressure pump at a higher capacity which in turn increased the flow rate of the liquid. When the moisture was above 13%, moisture content was decreased in either of two ways, by increasing the temperature of the burner or by operating the hydraulic pressure pump at a lower capacity which in turn decreased the flow rate of the liquid. The loose bulk density of the powder ranged from about 35 to about 42 pounds per cubic foot. The feed particle size distribution of a typical powder sample was as follows: 1.5% of the particles by weight were less than 100 microns; 15% of the particles by weight were less than 200 microns; 35% of the particles by weight were less than 270 microns; 55% of the particles by weight were less than 400 microns.

In an example, conversion of the fine powder to form granules was effected by an apparatus comprising a mechanical roller compactor, with pocket rollers at 8 rpm rotation and 1700 psi. Compacted granules were blown out pneumatically and screened by means of a vibratory screener to achieve relative uniformity of size distribution. For example, granules of 2.1 mm-4.0 mm were prepared for various agricultural uses, and granules of 0.8 mm-2.0 mm were prepared for horticultural use.

Resulting granules dissolved readily in water and have been found to aid plant growth in both agricultural and horticultural applications.

Aspects of a process such as is described in various embodiments herein are further illustrated by the following further examples, which are set forth to illustrate certain aspects of a process such as is described in various embodiments herein and are not to be construed as limiting thereof.

Further Example 1

A process for making a water-soluble granule enriched in humic acid, the process comprising:
  obtaining a sample of a carbonaceous substance comprising humic acid and one or more other substances;
  contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;
  maintaining the sludge component in contact with the extraction component for a period of time sufficient for the extraction component to become relatively enriched in humic acid and the sludge component to become relatively depleted of humic acid;
  separating the sludge component from the extraction component;
  drying the extraction component, thereby forming a plurality of powder particles; compacting at least a portion of the plurality of powder particles under conditions wherein the at least a portion of the plurality of powder particles, as a result of the compacting, are made into a form of a granule;
thereby making a water-soluble granule enriched in humic acid.

Further Example 2

A process according to further example 1, wherein the carbonaceous substance comprises a coal and/or a claystone and/or a mudstone and/or a shale.

Further Example 3

A process according to further example 1, wherein the carbonaceous substance comprises a lignite and/or a Leonardite and/or a Humalite.

Further Example 4

A process according to further example 1, wherein the carbonaceous substance comprises a Humalite.

Further Example 5

A process according to further example 1, wherein the alkaline mixture comprises water.

Further Example 6

A process according to further example 1, wherein the alkaline mixture comprises a base.

Further Example 7

A process according to further example 1, wherein the alkaline mixture comprises sodium hydroxide or potassium hydroxide.

Further Example 8

A process according to further example 1, wherein the alkaline mixture comprises caustic potash solution.

Further Example 9

A process according to further example 1, wherein the alkaline mixture comprises, by mass, between about 10 and about 15 parts water, and about 1 part caustic potash solution, wherein the caustic potash solution is 45% membrane grade.

Further Example 10

A process according to further example 1, wherein the alkaline mixture comprises, by mass, about 73.7 parts water and about 5.8 parts caustic potash solution, wherein the caustic potash solution is 45% membrane grade.

Further Example 11

A process according to further example 1, wherein the mass ratio of the alkaline mixture to the sample is between about 75:25 and about 84:16.

Further Example 12

A process according to further example 1, wherein the mass ratio of the alkaline mixture to the sample is between about 78:22 and about 81:13.

Further Example 13

A process according to further example 1, wherein the mass ratio of the alkaline mixture to the sample is about 79.5:20.5.

Further Example 14

A process according to further example 1, wherein the sludge component is maintained in contact with the extraction component for between about 4 hours and about 12 hours.

Further Example 15

A process according to further example 1, wherein the sludge component is maintained in contact with the extraction component for between about 6 hours and about 10 hours.

Further Example 16

A process according to further example 1, wherein the sludge component is maintained in contact with the extraction component for about 8 hours.

Further Example 17

A process according to further example 1, wherein the sludge component is maintained in contact with the extraction component for a period of time sufficient for the extraction component to possess a humic acid content of at least about 6%.

Further Example 18

A process according to further example 1, wherein the sludge component is maintained in contact with the extraction component for a period of time sufficient for the extraction component to possess a humic acid content of at least about 14%.

Further Example 19

A process according to further example 1, wherein the sludge component is maintained in contact with the extraction component for a period of time sufficient for the extraction component to possess a humic acid content of at least about 17%.

Further Example 20

A process according to further example 1, wherein the sludge component is maintained in contact with the extraction component for a period of time sufficient for the extraction component to possess a humic acid content of at least about 18%.

Further Example 21

A process according to further example 1, wherein the separating is effected by filtration.

Further Example 22

A process according to further example 1, wherein the separating is effected by sedimentation.

Further Example 23

A process according to further example 1, wherein the drying is effected by spray drying.

Further Example 24

A process according to further example 1, wherein the drying is effected by spray drying, and wherein the spray drying is characterized by an inlet temperature and an outlet temperature, and wherein the inlet temperature is between about 500 degrees Fahrenheit and about 800 degrees Fahrenheit, and wherein the outlet temperature is between about 150 degrees Fahrenheit and about 250 degrees Fahrenheit.

Further Example 25

A process according to further example 1, wherein the drying is effected by spray drying, and wherein the spray drying is characterized by an inlet temperature and an outlet temperature, and wherein the inlet temperature is between about 600 degrees Fahrenheit and about 650 degrees Fahrenheit, and wherein the outlet temperature is between about 150 degrees Fahrenheit and about 180 degrees Fahrenheit.

Further Example 26

A process according to further example 1, wherein the plurality of powder particles is characterized by a moisture content, and wherein the moisture content is between about 9% and about 15%.

Further Example 27

A process according to further example 1, wherein the plurality of powder particles is characterized by a moisture content, and wherein the moisture content is between about 10% and about 14%.

Further Example 28

A process according to further example 1, wherein the plurality of powder particles is characterized by a moisture content, and wherein the moisture content is between about 11% and about 13%.

Further Example 29

A process according to further example 1, wherein the plurality of powder particles is characterized by a loose bulk density, and wherein the loose bulk density is between about 28 and about 49 pounds per cubic foot.

Further Example 30

A process according to further example 1, wherein the plurality of powder particles is characterized by a loose bulk density, and wherein the loose bulk density is between about 31.5 and about 45.5 pounds per cubic foot.

Further Example 31

A process according to further example 1, wherein the plurality of powder particles is characterized by a loose bulk density, and wherein the loose bulk density is between about 35 and about 42 pounds per cubic foot.

Further Example 32

A process according to further example 1, wherein the plurality of powder particles is characterized by a particle size distribution, and wherein, in the particle size distribution, about 1.5% of the particles by weight are less than about 100 microns, about 15% of the particles by weight are less than about 200 microns, about 35% of the particles by weight are less than 270 microns, and about 55% of the particles by weight are less than about 400 microns.

Further Example 33

A process according to further example 1, wherein the compacting is effected by an apparatus comprising a roller compactor.

Further Example 34

A process according to further example 1, wherein the compacting is effected by an apparatus comprising a roller compactor, and wherein the speed of the roller compactor is about 8 rpm.

Further Example 35

A process according to further example 1, wherein the compacting is effected by an apparatus comprising a roller compactor, and wherein the pressure exerted by the roller compactor is about 1700 psi.

Further Example 36

A process according to further example 1, wherein the compacting is effected by an apparatus comprising a roller compactor, wherein the speed of the roller compactor is about 8 rpm, and wherein the pressure exerted by the roller compactor is about 1700 psi.

Further Example 37

A process according to further example 1, wherein the granule is between about 0.5 mm and about 4.5 mm.

Further Example 38

A process according to further example 1, wherein the granule is between about 0.8 mm and about 4.0 mm.

Further Example 39

A process according to further example 1, wherein the granule is between about 0.8 mm and about 2.0 mm.

Further Example 40

A process according to further example 1, wherein the granule is between about 2.1 mm and about 4.0 mm.

Further Example 41

A process according to further example 1, wherein at least about 75% of the granule is dissolved in five minutes when the granule is submerged in one liter of water at a temperature of 25 degrees Celsius.

Further Example 42

A process according to further example 1, wherein at least about 90% of the granule is dissolved in five minutes when the granule is submerged in one liter of water at a temperature of 25 degrees Celsius.

Further Example 43

A process according to further example 1, wherein at least about 95% of the granule is dissolved in five minutes when the granule is submerged in one liter of water at a temperature of 25 degrees Celsius.

Further Example 44

A process according to further example 1, wherein at least about 99% of the granule is dissolved in five minutes when the granule is submerged in one liter of water at a temperature of 25 degrees Celsius.

Further Example 45

A process according to further example 1, wherein 100% of the granule is dissolved in five minutes when the granule is submerged in one liter of water at a temperature of 25 degrees Celsius.

Further Example 46

A process according to further example 1, wherein at least about 75% of the granule is dissolved in one minute when the granule is submerged in one liter of water at a temperature of 25 degrees Celsius.

Further Example 47

A process according to further example 1, wherein at least about 90% of the granule is dissolved in one minute when the granule is submerged in one liter of water at a temperature of 25 degrees Celsius.

Further Example 48

A process according to further example 1, wherein at least about 95% of the granule is dissolved in one minute when the granule is submerged in one liter of water at a temperature of 25 degrees Celsius.

Further Example 49

A process according to further example 1, wherein at least about 99% of the granule is dissolved in one minute when the granule is submerged in one liter of water at a temperature of 25 degrees Celsius.

Further Example 50

A process according to further example 1, wherein 100% of the granule is dissolved in one minute when the granule is submerged in one liter of water at a temperature of 25 degrees Celsius.

Aspects of a water-soluble granule such as is described in various embodiments herein are further illustrated by the following further examples, which are set forth to illustrate certain aspects of a process such as is described in various embodiments herein and are not to be construed as limiting thereof.

Further Example 51

A water-soluble granule enriched in humic acid, the granule made by a process comprising:
 obtaining a sample of a carbonaceous substance comprising humic acid and one or more other substances;
 contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;
 maintaining the sludge component in contact with the extraction component for a period of time sufficient for the extraction component to become relatively enriched in humic acid and the sludge component to become relatively depleted of humic acid;
 separating the sludge component from the extraction component;
 drying the extraction component, thereby forming a plurality of powder particles; and compacting at least a portion of the plurality of powder particles under conditions wherein the at least a portion of the plurality of powder particles, as a result of the compacting, are made into a form of a granule.

Further Example 52

A granule according to further example 51, wherein the carbonaceous substance comprises a coal and/or a claystone and/or a mudstone and/or a shale.

Further Example 53

A granule according to further example 51, wherein the carbonaceous substance comprises a lignite and/or a Leonardite and/or a Humalite.

Further Example 54

A granule according to further example 51, wherein the carbonaceous substance comprises a Humalite.

Further Example 55

A granule according to further example 51, wherein the alkaline mixture comprises water.

Further Example 56

A granule according to further example 51, wherein the alkaline mixture comprises a base.

Further Example 57

A granule according to further example 51, wherein the alkaline mixture comprises sodium hydroxide or potassium hydroxide.

Further Example 58

A granule according to further example 51, wherein the alkaline mixture comprises caustic potash solution.

Further Example 59

A granule according to further example 51, wherein the alkaline mixture comprises, by mass, between about 10 and about 15 parts water, and about 1 part caustic potash solution, wherein the caustic potash solution is 45% membrane grade.

Further Example 60

A granule according to further example 51, wherein the alkaline mixture comprises, by mass, about 73.7 parts water and about 5.8 parts caustic potash solution, wherein the caustic potash solution is 45% membrane grade.

Further Example 61

A granule according to further example 51, wherein the mass ratio of the alkaline mixture to the sample is between about 75:25 and about 84:16.

Further Example 62

A granule according to further example 51, wherein the mass ratio of the alkaline mixture to the sample is between about 78:22 and about 81:13.

Further Example 63

A granule according to further example 51, wherein the mass ratio of the alkaline mixture to the sample is about 79.5:20.5.

Further Example 64

A granule according to further example 51, wherein the sludge component is maintained in contact with the extraction component for between about 4 hours and about 12 hours.

Further Example 65

A granule according to further example 51, wherein the sludge component is maintained in contact with the extraction component for between about 6 hours and about 10 hours.

Further Example 66

A granule according to further example 51, wherein the sludge component is maintained in contact with the extraction component for about 8 hours.

Further Example 67

A granule according to further example 51, wherein the sludge component is maintained in contact with the extraction component for a period of time sufficient for the extraction component to possess a humic acid content of at least about 6%.

Further Example 68

A granule according to further example 51, wherein the sludge component is maintained in contact with the extraction component for a period of time sufficient for the extraction component to possess a humic acid content of at least about 14%.

Further Example 69

A granule according to further example 51, wherein the sludge component is maintained in contact with the extraction component for a period of time sufficient for the extraction component to possess a humic acid content of at least about 17%.

Further Example 70

A granule according to further example 51, wherein the sludge component is maintained in contact with the extraction component for a period of time sufficient for the extraction component to possess a humic acid content of at least about 18%.

Further Example 71

A granule according to further example 51, wherein the separating is effected by filtration.

Further Example 72

A granule according to further example 51, wherein the separating is effected by sedimentation.

Further Example 73

A granule according to further example 51, wherein the drying is effected by spray drying.

Further Example 74

A granule according to further example 51, wherein the drying is effected by spray drying, and wherein the spray drying is characterized by an inlet temperature and an outlet temperature, and wherein the inlet temperature is between about 500 degrees Fahrenheit and about 800 degrees Fahrenheit, and wherein the outlet temperature is between about 150 degrees Fahrenheit and about 250 degrees Fahrenheit.

Further Example 75

A granule according to further example 51, wherein the drying is effected by spray drying, and wherein the spray drying is characterized by an inlet temperature and an outlet temperature, and wherein the inlet temperature is between about 600 degrees Fahrenheit and about 650 degrees Fahrenheit, and wherein the outlet temperature is between about 150 degrees Fahrenheit and about 180 degrees Fahrenheit.

Further Example 76

A granule according to further example 51, wherein the plurality of powder particles is characterized by a moisture content, and wherein the moisture content is between about 9% and about 15%.

Further Example 77

A granule according to further example 51, wherein the plurality of powder particles is characterized by a moisture content, and wherein the moisture content is between about 10% and about 14%.

Further Example 78

A granule according to further example 51, wherein the plurality of powder particles is characterized by a moisture content, and wherein the moisture content is between about 11% and about 13%.

Further Example 79

A granule according to further example 51, wherein the plurality of powder particles is characterized by a loose bulk density, and wherein the loose bulk density is between about 28 and about 49 pounds per cubic foot.

Further Example 80

A granule according to further example 51, wherein the plurality of powder particles is characterized by a loose bulk density, and wherein the loose bulk density is between about 31.5 and about 45.5 pounds per cubic foot.

Further Example 81

A granule according to further example 51, wherein the plurality of powder particles is characterized by a loose bulk density, and wherein the loose bulk density is between about 35 and about 42 pounds per cubic foot.

Further Example 82

A granule according to further example 51, wherein the plurality of powder particles is characterized by a particle size distribution, and wherein, in the particle size distribution, about 1.5% of the particles by weight are less than about 100 microns, about 15% of the particles by weight are less than about 200 microns, about 35% of the particles by weight are less than 270 microns, and about 55% of the particles by weight are less than about 400 microns.

Further Example 83

A granule according to further example 51, wherein the compacting is effected by an apparatus comprising a roller compactor.

Further Example 84

A granule according to further example 51, wherein the compacting is effected by an apparatus comprising a roller compactor, and wherein the speed of the roller compactor is about 8 rpm.

Further Example 85

A granule according to further example 51, wherein the compacting is effected by an apparatus comprising a roller compactor, and wherein the pressure exerted by the roller compactor is about 1700 psi.

Further Example 86

A granule according to further example 51, wherein the compacting is effected by an apparatus comprising a roller compactor, wherein the speed of the roller compactor is about 8 rpm, and wherein the pressure exerted by the roller compactor is about 1700 psi.

Further Example 87

A granule according to further example 51, wherein the granule is between about 0.5 mm and about 4.5 mm.

Further Example 88

A granule according to further example 51, wherein the granule is between about 0.8 mm and about 4.0 mm.

Further Example 89

A granule according to further example 51, wherein the granule is between about 0.8 mm and about 2.0 mm.

Further Example 90

A granule according to further example 51, wherein the granule is between about 2.1 mm and about 4.0 mm.

Further Example 91

A granule according to further example 51, wherein at least about 75% of the granule is dissolved in five minutes when the granule is submerged in one liter of water at a temperature of 25 degrees Celsius.

Further Example 92

A granule according to further example 51, wherein at least about 90% of the granule is dissolved in five minutes when the granule is submerged in one liter of water at a temperature of 25 degrees Celsius.

Further Example 93

A granule according to further example 51, wherein at least about 95% of the granule is dissolved in five minutes when the granule is submerged in one liter of water at a temperature of 25 degrees Celsius.

Further Example 94

A granule according to further example 51, wherein at least about 99% of the granule is dissolved in five minutes when the granule is submerged in one liter of water at a temperature of 25 degrees Celsius.

Further Example 95

A granule according to further example 51, wherein 100% of the granule is dissolved in five minutes when the granule is submerged in one liter of water at a temperature of 25 degrees Celsius.

Further Example 96

A granule according to further example 51, wherein at least about 75% of the granule is dissolved in one minute when the granule is submerged in one liter of water at a temperature of 25 degrees Celsius.

Further Example 97

A granule according to further example 51, wherein at least about 90% of the granule is dissolved in one minute when the granule is submerged in one liter of water at a temperature of 25 degrees Celsius.

Further Example 98

A granule according to further example 51, wherein at least about 95% of the granule is dissolved in one minute when the granule is submerged in one liter of water at a temperature of 25 degrees Celsius.

Further Example 99

A granule according to further example 51, wherein at least about 99% of the granule is dissolved in one minute when the granule is submerged in one liter of water at a temperature of 25 degrees Celsius.

Further Example 100

A granule according to further example 51, wherein 100% of the granule is dissolved in one minute when the granule is submerged in one liter of water at a temperature of 25 degrees Celsius.

Aspects of a process such as is described in various embodiments herein are further illustrated by the following further example, which is set forth to illustrate certain aspects of a process such as is described in various embodiments herein and are not to be construed as limiting thereof.

Further Example 101

A process for making a water-soluble granule enriched in humic acid, the process comprising:
- (a) obtaining a sample of a carbonaceous substance comprising humic acid and one or more other substances, wherein the carbonaceous substance comprises a coal and/or a claystone and/or a mudstone and/or a shale and/or a lignite and/or a Leonardite and/or a Humalite;
- (b) contacting the sample with an amount of an alkaline mixture, wherein the mass ratio of the alkaline mixture to the sample is between about 75:25 and about 84:16, and wherein the alkaline mixture comprises sodium hydroxide or potassium hydroxide or caustic potash solution, thereby forming an extraction mixture, the extraction mixture consisting essentially of a sludge component, the sludge component comprising, predominantly, the sample, and an extraction component, the extraction component comprising, predominantly, the alkaline mixture;
- (c) maintaining the sludge component in contact with the extraction component for a period of time sufficient for the extraction component to become relatively enriched in humic acid and the sludge component to become relatively depleted of humic acid, and wherein the period of time is sufficient for the extraction component to possess a humic acid content of at least about 6%;
- (d) separating the sludge component from the extraction component, wherein the separating is effected by filtration and/or by sedimentation and/or by spray-drying;
- (e) drying the extraction component, thereby forming a plurality of powder particles, wherein the drying is effected by spray drying, and wherein the spray drying is characterized by an inlet temperature and an outlet temperature, and wherein the inlet temperature is between about 500 degrees Fahrenheit and about 800 degrees Fahrenheit, and wherein the outlet temperature is between about 150 degrees Fahrenheit and about 250 degrees Fahrenheit; wherein the plurality of powder particles is characterized by a moisture content, and wherein the moisture content is between about 9% and about 15%; wherein the plurality of powder particles is characterized by a loose bulk density, and wherein the loose bulk density is between about 28 and about 49 pounds per cubic foot; and wherein the plurality of powder particles is characterized by a particle size distribution, and wherein, in the particle size distribution, about 1.5% of the particles by weight are less than about 100 microns, about 15% of the particles by weight are less than about 200 microns, about 35% of the particles by weight are less than 270 microns, and about 55% of the particles by weight are less than about 400 microns; and
- (f) compacting at least a portion of the plurality of powder particles under conditions wherein the at least a portion of the plurality of powder particles, as a result of the compacting, are made into a form of a granule; wherein the compacting is effected by an apparatus comprising a roller compactor, wherein the speed of the roller compactor is about 8 rpm, and wherein the pressure exerted by the roller compactor is about 1700 psi; wherein the granule is between about 0.5 mm and about 4.5 mm; and wherein at least about 75% of the granule is dissolved in five minutes when the granule is submerged in one liter of water at a temperature of 25 degrees Celsius;

thereby making a water-soluble granule enriched in humic acid.

Humic acid-supplemented fertilizers in accordance with the invention are superior to simple mixtures of fertilizers and conventional humic acid products, or fertilizers coated with such conventional humic acid products. The invention provides solid fertilizers coated with the highly soluble humic acid products, as well as solid agglomerated fertilizers wherein a highly water soluble humic acid fraction is substantially uniformly intermixed within the fertilizer solids; these types of products are generally produced by co-agglomerating the normal raw ingredients of the fertilizer together with humic acids. The humic acids used are preferably 100% water soluble, wet chemistry activated products, and may be of the type commercialized by Humic Growth Solutions of Jacksonville, Fla., under the trademarks humiK™ or Diamond Grow®. They may be in salt form (e.g., potassium), or in the free acid form.

The products of the invention may be formulated with a variety of different solid fertilizers, including MAP, DAP, and any one of a number of NPK fertilizer products, such as ammonium nitrate, ammonium sulfate, urea, ammonium phosphates, sodium nitrate, calcium nitrate, potassium nitrate, nitrate of soda, urea formaldehyde, metal (e.g. zinc, iron) ammonium phosphates; phosphorous materials such as calcium phosphates (normal phosphate and super phosphate), ammonium phosphate, ammoniated super phosphate, phosphoric acid, superphosphoric acid, basic slag, rock phosphate, colloidal phosphate, bone phosphate; potassium materials such as potassium chloride, potassium sulfate, potassium nitrate, potassium phosphate, potassium hydroxide, potassium carbonate; calcium materials, such as calcium sulfate, calcium carbonate, calcium nitrate; magnesium materials, such as magnesium carbonate, magnesium oxide, magnesium sulfate, magnesium hydroxide; sulfur materials such as ammonium sulfate, sulfates of other fertilizers discussed herein, ammonium thiosulfate, elemental sulfur (either alone or included with or coated on other fertilizers); micronutrients such as Zn, Mn, Cu, Fe, and other micronutrients discussed herein; oxides, sulfates, chlorides, and chelates of such micronutrients (e.g., zinc oxide, zinc sulfate and zinc chloride); such chelates sequestered onto other carriers such as EDTA; boron materials such as boric acid, sodium borate or calcium borate; and molybdenum materials such as sodium molybdate.

In preferred preparative procedures for the agglomerated fertilizer products, the humic acids are added to the ingredients of the solid fertilizer during agglomeration thereof. For example, such composite products may be made via chemical reaction processes using rotary drum granulators, rotary pan granulators, fluid bed granulators, or prilling towers. Alternately, physical granulation methods may be employed using similar equipment except that, in lieu of adding chemical reactant(s), binding agents such as lignosulfonates or attapulgite clay may be added to the mixtures to form agglomerated products.

In these agglomeration methods, the humic acids are typically used in amounts of from about 0.01-12% by weight, more preferably from about 0.02-8% by weight, and most preferably from about 1-5% by weight, based upon the total weight of the products taken as 100% by weight. The humic acids may be in granular or powdered form, or alternately the powders may be dispersed in water or other dispersant. By virtue of these methods, the humic acid fraction is substantially uniformly distributed throughout the solid fertilizer products.

Where coated fertilizer products are desired, finished solid fertilizers are coated with the water soluble humic acid products of the invention, typically via simple mixing of the solid fertilizers with the humic acids, or by spraying the humic acids onto such solid fertilizers.

Further Example 102

2000 lbs of granular urea was mixed with 200 lbs of the 100% soluble wet chemistry activated humic acids and 12 lbs of conventional binder for a period of 2-3 hours under ambient temperature conditions. This resulted in a consistent and stable fertilizer product.

Further Example 103

2000 lbs of granular MAP was mixed with 55 lbs of the 100% soluble wet chemistry activated humic acids and 55 lbs of lime, for a mixing time of 15-30 minutes under ambient temperature conditions.

The solid fertilizer products largely prevent nitrogen losses from the products by the assimilation of humic acids into the fertilizer during production thereof. For example, humic-bound nitrogen within the fertilizers minimizes leaching losses, thus assuring the supply of appropriate nutrients to plants. The soil amending properties of humic acids and chosen drying agent can further benefit the plants and maintain the organic nature of farming. Other expected benefits include potential cost savings, increased profit, and a reduction in environmental damage.

Many modifications and other embodiments of a process such as is described in various embodiments herein will come to mind to one skilled in the art, based upon the foregoing description. Therefore, it is to be understood that the processes and products are not limited to the specific embodiments disclosed herein, and that modifications and other embodiments are intended to be included within the scope of the appended claims. Although specific terms are employed herein, they are used in a generic and descriptive sense only and not for purposes of limitation.

I claim:

1. A method of producing a monoammonium phosphate (MAP) or diammonium phosphate (DAP) granulated fertilizer, comprising the steps of adding a humic acid component comprising a potassium salt of humic acid to the precursor ingredients of MAP or DAP, and carrying out a chemical reaction in a rotary drum granulator to produce a granulated MAP or DAP fertilizer having humic acid uniformly dispersed throughout the structure thereof, wherein said humic acid component being present at a level of from about 2.6-12% by weight, based upon the total weight of the granulated fertilizer taken as 100% by weight, wherein said humic acid component comprising particles having a size distribution where about 1.5% by weight of the humic acid particles are less than about 100 microns, the particles being at least about 95% by weight humic acids, and at least about 75% by weight of a 1 g sample of the particles will dissolve within 5 minutes in 1000 g of 25° C. water, wherein said humic acid component is prepared by a process comprising the steps of:

(i) providing a sample of a carbonaceous substance comprising humic acid and one or more other substances;

(ii) contacting said sample with an amount of an alkaline mixture, thereby forming an extraction mixture containing a sludge component;

(iii) maintaining said sludge component in contact with an extraction component for a period of time sufficient for said extraction component to become relatively enriched in said humic acid and said sludge component to become relatively depleted of said humic acid;

(iv) separating said sludge component from said extraction component; and (v) drying said extraction component to thereby form said humic acid component, wherein said drying comprises spray drying said extraction component into a plurality of powder particles having a moisture content of between about 9% and about 15%.

2. The method of claim 1, said fertilizer being granulated MAP.

3. The method of claim 1, said fertilizer being granulated DAP.

4. The method of claim 1, wherein said powder particles have a particle size distribution, and wherein, in said particle size distribution, about 1.5% of said powder particles by weight are less than about 100 microns, about 15% of said powder particles by weight are less than about 200 microns, about 35% of said powder particles by weight are less than 270 microns, and about 55% of said powder particles by weight are less than about 400 microns.

5. A product made in accordance with the method of claim 1.

6. A method of producing a monoammonium phosphate (MAP) or diammonium phosphate (DAP) granulated fertilizer, comprising the steps of adding humic acid component selected from the group consisting of humic acid or a salt thereof to the precursor ingredients of MAP or DAP, and carrying out a chemical reaction in a rotary drum granulator to produce a granulated MAP or DAP fertilizer having humic acid uniformly dispersed throughout the structure thereof, wherein said humic acid component being present at a level of from 2.6 to 12% by weight, based upon the total weight of the granulated fertilizer taken as 100% by weight, wherein said humic acid component is prepared by a process comprising the steps of:

(i) providing a sample of a carbonaceous substance comprising humic acid and one or more other substances;

(ii) contacting said sample with an amount of an alkaline mixture, thereby forming an extraction mixture containing a sludge component;

(iii) maintaining said sludge component in contact with an extraction component for a period of time sufficient for said extraction component to become relatively enriched in said humic acid and said sludge component to become relatively depleted of said humic acid;

(iv) separating said sludge component from said extraction component; and (v) drying said extraction component to thereby form said humic acid component, wherein said drying comprises spray drying said extraction component into a plurality of powder particles having a loose bulk density of between about 28 and about 49 pounds per cubic foot.

7. The method of claim 6, said salt of humic acid being a potassium salt, wherein said alkaline mixture comprises potassium hydroxide.

8. The method of claim 6, said fertilizer being granulated MAP.

9. The method of claim 6, said fertilizer being granulated DAP.

10. The method of claim 6, wherein said humic acid component comprising particles having a size distribution where about 1.5% by weight of the humic acid particles are less than about 100 microns, the particles being at least about 95% by weight humic acids, and at least about 75% by weight of a 1 g sample of the particles will dissolve within 5 minutes in 1000 g of 25° C. water.

11. The method of claim 6, wherein said humic acid component is in the form of a powder or granules.

12. The method of claim 6, wherein said powder particles have a particle size distribution, and
wherein, in said particle size distribution, about 1.5% of said powder particles by weight are less than about 100 microns, about 15% of said powder particles by weight are less than about 200 microns, about 35% of said powder particles by weight are less than 270 microns, and about 55% of said powder particles by weight are less than about 400 microns.

13. A product made in accordance with the method of claim 6.

* * * * *